US011887456B1

(12) United States Patent
Herron

(10) Patent No.: US 11,887,456 B1
(45) Date of Patent: Jan. 30, 2024

(54) DEFERRABLE TRACKING FOR GPS MOBILE COMMUNICATION DEVICES

(71) Applicant: Herron Holdings Group LLC, Dexter, MI (US)

(72) Inventor: Brian J. Herron, Dexter, MI (US)

(73) Assignee: Herron Holdings Group LLC, Dexter, MI (US)

( * ) Notice: Subject to any disclaimer, the term of this patent is extended or adjusted under 35 U.S.C. 154(b) by 0 days.

(21) Appl. No.: 17/967,296

(22) Filed: Oct. 17, 2022

(51) Int. Cl.
*G08B 21/02* (2006.01)

(52) U.S. Cl.
CPC ....... *G08B 21/0269* (2013.01); *G08B 21/025* (2013.01); *G08B 21/0258* (2013.01)

(58) Field of Classification Search
CPC .............. G08B 21/0269; G08B 21/025; G08B 21/0258
See application file for complete search history.

(56) References Cited

U.S. PATENT DOCUMENTS 6,922,566 B2 7/2005 Puranik et al.
7,026,928 B1 * 4/2006 Lane ...................... H04M 11/04 455/457
7,042,338 B1 5/2006 Weber
8,538,374 B1 9/2013 Haimo et al.
8,538,458 B2 * 9/2013 Haney ................... H04W 68/12 455/457
8,718,594 B2 * 5/2014 Braznell ............ G08B 21/0283 455/418
9,071,643 B2 * 6/2015 Saito .................... G08B 25/016
9,438,682 B2 9/2016 Hornor et al.
9,818,280 B2 11/2017 Mangum
9,967,704 B1 5/2018 Haney
10,104,527 B1 10/2018 Keil et al.
10,368,201 B2 7/2019 Hornor et al.
(Continued)

FOREIGN PATENT DOCUMENTS

EP 1215508 A1 6/2002
EP 3273418 A1 1/2018
GB 2410850 A 8/2005

OTHER PUBLICATIONS

Family Tracker App webpages from https://myfamilytracker.com.
(Continued)

*Primary Examiner* — Albert K Wong
(74) *Attorney, Agent, or Firm* — Gardner, Linn, Burkhart & Ondersma LLP

(57) ABSTRACT

A method is provided for a parent to determine a geo location of a child and the child may defer the release of their location by providing an affirmative response to the parent, the parent and child each having a network accessible device and the child's device being GPS enabled. The method utilizes a server based application in which the parent may request a response from the child. The application starts a countdown timer and the child must respond to the parent before the timer expires. If the timer expires and the child has not responded, the application attempts to determine the geo location of the child's device and forward any determined location to the parent's device. The method provides a parent peace of mind that they might locate their child in an emergency while providing the child a level of autonomy without feeling that they are constantly being watched.

11 Claims, 2 Drawing Sheets

(56) References Cited

U.S. PATENT DOCUMENTS

| | | | |
|---|---|---|---|
| 10,701,045 B2 | 6/2020 | Hornor et al. | |
| 2003/0034881 A1 | 2/2003 | Linnett et al. | |
| 2011/0294457 A1* | 12/2011 | Braznell | G08B 21/0227 455/404.1 |
| 2013/0109427 A1 | 5/2013 | Matus | |
| 2016/0134644 A1 | 5/2016 | Chan et al. | |
| 2018/0332162 A1* | 11/2018 | Schutter | H04W 12/61 |
| 2019/0356642 A1* | 11/2019 | Hornor | G08B 21/02 |
| 2020/0342736 A1 | 10/2020 | Tan et al. | |

OTHER PUBLICATIONS

Find My Kids App webpages from https://findmykids.org/en.
Glympse App webpages from https://glympse.com/get-glympse-app.
SecuraFone App webpage from www.securafone.com/home.
Vismo App webpages from https://vismo.com.

* cited by examiner

DEFERRABLE TRACKING FOR GPS MOBILE COMMUNICATION DEVICES

FIELD OF THE INVENTION

The present invention is directed to a method for locating an individual with a global positioning system (GPS), and in particular locating an individual's GPS enabled mobile communication device.

BACKGROUND OF THE INVENTION

Even prior to the prevalence of cell phones, keeping tabs on any child was a difficult and concerning task for parents. Various cell phone based application software programs, commonly referred to as applications or "apps", are now available for parents to determine and/or track the geo location of their children utilizing GPS enabled cell phones. As many parents and adolescents know, autonomy is a desire for adolescents as they continue to age, learn responsibility, and grow trust with their parents. A parent hovering over or constantly monitoring their child may make a child perceive that their parent does not trust them. Similar concerns and feelings can arise in other relationship dynamics, such as between employers and their employees. With the advent of many GPS enabled tracking and monitoring applications, many children and/or employees feel as though they are constantly being watched.

SUMMARY OF THE INVENTION

The present invention provides a method and system, such as in the form of an application software program or app, which enables a parent, third party, or other requesting individual to locate a child or other subject individual via that individual's GPS enabled mobile device in the event that the subject individual is unresponsive or otherwise unable to respond to the requesting individual. The release of the child's geo location is deferrable by the child as the method only selectively determines the child's geo location and forwards that location information to the parent after the child has failed to respond to a check-in or communication request made by the parent via the app. The child's geo location is not constantly or consistently monitored or tracked by the application. As such, the method provides the child or subject individual with a certain degree of autonomy which is only relinquished when the child fails to respond to the parent within a pre-determined time interval. In other words, the child may defer or interrupt the disclosure of their geo location by making a satisfactory or adequate response to the parent via the app. The app may include additional features such as requiring the child to enter a personal identification token that only the child should know or have access to, enabling the use of a safe word in the event the child is in danger but otherwise unable to communicate with the parent, and remotely accessing and enabling functions of the child's mobile device to create an emergency signal, such as flashing a light on the device, playing a sound through a speaker of the device, or turning on a camera of the device and recording video.

According to one form of the present invention, a method of deferrable tracking of a subject individual's GPS enabled, network accessible mobile device is provided for selectively determining the subject's geo location in the event that the subject individual fails to respond to a requesting individual's request for response. The method includes executing or initiating a subject application or app on the requester's network accessible device. In order to execute the app, the requester sends a request via the app to the subject's GPS enabled, network accessible mobile device which is in communication with the requester's device over a network. Once executed, the app initiates a deadline countdown timer at a remote server to monitor a time interval representing a response deadline in which a response from the subject's device must be received by the requester's device. The remote server is in communication with each of the requester's device and the subject's device over the network. The method includes the app monitoring the deadline timer as well as the subject's device to determine if either the deadline time interval has expired or the subject has sent a response prior to the response deadline. The method permits the subject to defer the disclosure of their geo location by making an affirmative response to the requester. As such, the subject retains a level of autonomy while also providing some assurance to the requester that the subject is safe and/or locatable in the event of emergency. Accordingly, if a response is received from the subject's device prior to the response deadline, the app cancels the deadline countdown timer without releasing any geo location information of the subject's device. However, if, and only if, the response deadline expires prior to a response being received from the subject's device, the app, via the remote server, begins monitoring the subject's device to attempt to determine a current or last known geo location of the subject's device utilizing a global positioning system (GPS) that is in communication with the subject's device and the network. The method includes the app forwarding the geo location of the subject's device from the remote server to the requester's device.

In one aspect, after the initial deadline has expired and prior to the app forwarding the geo location of the subject's device to the requester's device, the method may further include sending a warning alert or signal to the subject's device and initiating a subsequent, last-chance or final countdown timer at the remote server to monitor a last-chance or final time interval representing a last-chance deadline in which a response from the subject's device must be received by the requester's device. If a response is received from the subject's device prior to the last-chance deadline, the app cancels the last-chance timer without releasing any GPS location information of the subject's device. However, if the last-chance deadline expires prior to a response being received from the subject's device, the app forwards the geo location of the subject's device from the remote server to the requester's device.

In another aspect, the app requires a qualifying response in which the subject must input a personal identification token in order to defer the release of their geo location. As such, the method may ensure that an individual other than the subject (e.g. a would-be kidnapper or a thief who has stolen the subject's device) is not able to defer the release of the geo location. Examples of personal identification tokens include a personal identification number or pin, a biometric identifier, and an alphanumeric password.

In yet another aspect, the app may be configured to receive a safe word, code, or phrase as an alternative response from the subject's device. Upon receiving the safe word, the app determines that the subject is in distress and performs one or more of the following functions (i) sending an alert to the requester and/or local authorities that the subject is in distress and (ii) determining the subject's geo location and forwarding it to the requester and/or local authorities. The function of the safe word option is particularly beneficial if the subject is being held against their will and enables the subject to respond that they are in distress without making it obvious to their captor that they are making a distress signal. For example, instead of providing a standard response with a personal identification token, the subject may input the safe phrase "I'll be home in time for dinner" which to the captor may appear harmless or innocuous, but the app understands that phrase as the safe phrase which initiates a predetermined sequence of events including emergency features or functions, such as automatically contacting local authorities.

In still another aspect, the method may include providing emergency alerts or signals via the subject's device by utilizing and controlling different components of the subject's device. For example, if the response deadline expires without a response from the subject's device, the method further includes triggering the subject's device to emit an alert or signal including one or more of the following functions: (i) sounding an alarm via a speaker of the subject's device, (ii) repeatedly flashing a light of the subject's device, and (iii) turning on a camera of the subject's device and recording video via the camera and forwarding the recorded video to the requester's device and/or local authorities via the remote server. The emergency alerts or signals may capture the attention of nearby bystanders or first responders to alert them that the subject is in distress or in need of assistance.

In another form of the present invention, a method is provided for determining the geo location of child after the child fails to respond in a timely manner to a parent's communication request. The method includes the parent sending an electronic communication from their network accessible device to the child's global positioning system (GPS) enabled, network accessible mobile device and requesting an affirmative response from the child. Upon the parent sending the communication to the child, the method includes triggering the execution of a subject application or app which subsequently initiates a countdown timer at a remote server to monitor a time interval in which the child may respond to the parent's request. If the child responds within the time interval they are able to defer the release of their geo location to the parent's device. The app determines whether the child has responded to the parent's request within the time interval, i.e. before the time interval expires. If the child affirmatively responds to the parent's request within the time interval, the app cancels the countdown timer and the child's geo location remains unrevealed to the parent. However, if the child has not responded to the parent's request and the time interval has expired, the app attempts to determine a current or last known geo location of the child's GPS enabled device. If the app determines a geo location of the child's device, the geo location forwarded to the parent's device over the network.

Accordingly, the present invention provides a method for locating a child via their GPS enabled, network accessible device while permitting the child to defer or interrupt the release of their location. The method utilizes an application and a remote server to monitor a countdown timer and monitor communications between the parent's device and the child's device. The parent may send a request to the child's device via the application, at which time the application initiates the countdown timer. If the child responds to the parent within the required time interval, the application terminates and the child's geo location remains unknown to the application or parent. However, if the countdown timer expires before the child responds to the parent the application attempts to determine a current or last known location of the child's device. If a location of the child's device in determined, the application forwards the location to the parent's device. The release of the child's geo location is no longer deferrable once the timer has expired without a response from the child. The method may include additional functions such as remotely controlling features of the child's phone to create a local emergency signal, requiring the child to input a personal identification token to defer the release of their geo location, and enabling the use of a safe word to initiate an alternative sequence of actions from the child's device.

These and other objects, advantages, purposes and features of this invention will become apparent upon review of the following specification in conjunction with the drawings.

DESCRIPTION OF THE PREFERRED EMBODIMENTS

Figure 1:
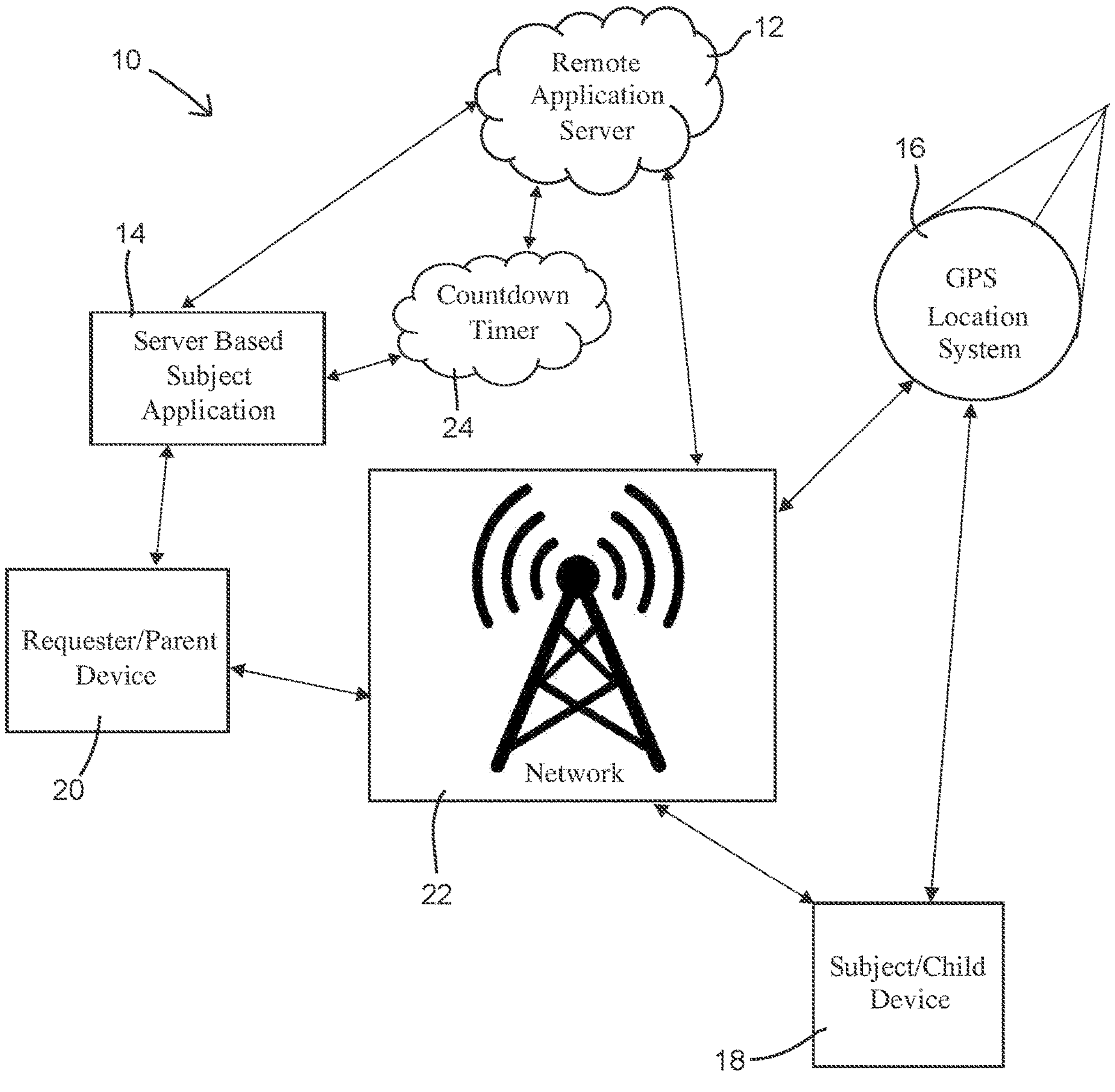
FIG. 1 is a diagram representation of a network-based system, in accordance with an embodiment of the present invention.
Figure 2:
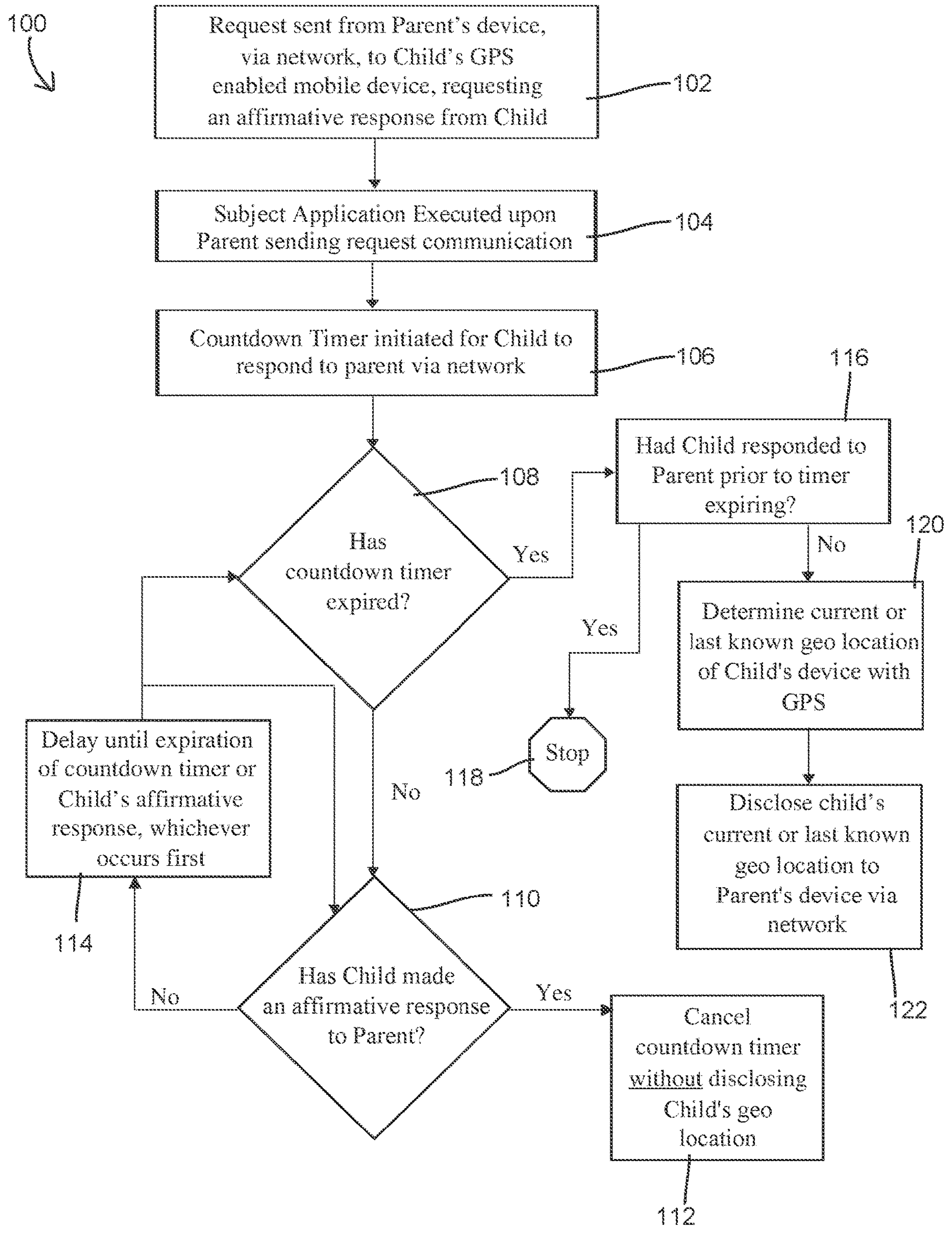
FIG. 2 is a diagram of a method for deferrable GPS tracking of a child's mobile network accessible device, in accordance with the present invention.

Referring now to the drawings and the illustrative embodiments depicted therein, a method 100 and a network-based system 10 for a remote server 12 based, subject deferrable geo location application or app 14 are provided for a third-party, concerned individual, or "requester" to determine a geo location of a subject individual or "subject" (e.g. child or employee) via the subject's global positioning system (GPS) 16 enabled, network accessible mobile communication device 18, e.g. cellular phone (FIGS. 1 and 2). The requester and the subject each having or carrying a network accessible mobile device 18 and 20 forming a portion of the network-based system 10 within which the subject deferrable app 14 is operable. The method 100 enables the subject to respond to a request from the requester prior to the subject's geo location being released to the requester. In this manner, the app 14 provides a level of autonomy to the subject without them feeling that they are constantly being watched by requester(s), while also providing an emergency location means for the requester to locate the subject.

It will be appreciated that the exemplary method 100 described herein may be adapted for various instances in which one individual, i.e. requester, would like a response from another individual, i.e. subject and if the subject does not respond, providing the subject's geo location to the requester. For example, an employer may request a response from an employee to determine the progress or status of their employee. In the event that the employee does not respond in the allotted time, the method 100 and app 14 provide the employee's current or last known geo location to the employer. In this manner, an employee may respond to let the employer know they are safe or that their status in general is okay. Thus, the employee maintains a level of autonomy in terms of their geo location, while also enabling an employer to perform a mitigating or emergency procedure or protocol in the event that it appears the employee is injured, unsafe, or otherwise unresponsive. The method 100 and app 14 do not determine, monitor, track, or share the subject's geo location unless the time interval for the subject to respond has expired without a response from the subject. In other words, the method 100 does not constantly or continuously track and monitor the subject's geo location. Conversely, the method 100 selectively performs the function of determining the subject's geo location in response to an expired time interval. In other words, the subject individual does not relinquish their location at all times, only after a pre-determined event, e.g. a failure to respond within a pre-determined time period. Thus, it may be said that the child or employee may defer the ability of the parent or employee to track and know the child/employee's geo location. Once the triggering event has occurred, e.g. expiration of the pre-determined time period, the subject's geo location is automatically released to the requester. While the above broadly describes an interaction between a requester and a subject, the remainder of the following description will refer to the requester as the parent and the subject as the child.

Referring to the illustrative embodiments of FIGS. 1 and 2, a method 100 of deferrable tracking of a child's GPS enabled, network accessible mobile device 18 (e.g cellular phone, tablet, mobile computer, etc.) is provided for determining the child's geo location in the event that the child fails to respond to a parent's request for response. The method 100 includes a parent initiating 102, via a subject application or app 14, a request for a response from a child's GPS enabled, network accessible mobile device 18 that is in communication with the parent's device over a network 22. Alternatively, the app 14 may have access to other apps or functions of the parent's device 20, such as the device's messaging app or function and if the parent inputs a particular sequence of words or characters (e.g. "initiate child locator") into the device's messaging app, the subject app 14 will be automatically initiated without the parent directly accessing the app 14. It is contemplated that the child's response may be returned via the app 14 or may be returned in the form of a phone call, a text message, or other form of electronic communication made via a built-in function of the child's device 18.

The method 100 includes executing 104 the app 14 on either the parent's network accessible device 20 or a remote application server 12, and preferably on the remote server 12 for purposes of additional child autonomy (FIGS. 1 and 2). The app 14 initiates 106 a deadline countdown timer 24 at the remote server 12 to monitor a time interval. The remote server 12 is in communication with both of the parent's device 20 and the child's device 18 over the network 22. The time interval represents a deadline in which the child's device 18 must make a response to the parent's device 20. The time interval may be customizable within the app 14 such that the parent may choose a user-defined period of time, such as fifteen minutes, one hour, 24 hours, etc., for example. The method 100, via the app 14, monitors 108 the deadline countdown timer 24 for the expiration of the time interval and monitors 110 the child's device 18 for a response to the parent's device 20 to determine if the child has responded prior to the response deadline.

The method 100 permits the child to defer (i.e. interrupt or stop) the disclosure of their geo location by making an affirmative response to the parent. As such, the app 14 permits the child to retain a level of autonomy while also reassuring the parent that the child is safe, or at least responsive. The level of response or parameters required of the child may be customized by the parent within the app 14 prior to the parent executing the response request. For example, the parent may determine that a simple text response is satisfactory or adequate to defer the geo location disclosure and may adjust the response settings in the app accordingly. In other instances, the parent may determine that a higher level a response shall be required, such as the child calling the parent's device or that the child must disclose their current location in the form of an address, in which the parent would set the desired parameters in the app prior to executing the response request. An additional option for the app may include that in order to set parameters for what qualifies as a satisfactory response, both the parent and the child must make affirmative inputs into the app via their respective devices. Such a feature may facilitate a greater level of trust between the parent and child.

Accordingly, if it is determined at 108 and 110 that a response has been received from the child's device prior to the response deadline, the app 14 cancels 112 the deadline countdown timer 24 without releasing any geo location information of the child's device 18 (FIGS. 1 and 2). If the app 14 determines that the countdown timer is still active (i.e. the time interval has not expired), the method 100, via the app 14, delays or waits 114 until either of (i) the time interval expires or (ii) the child responds to the parent, whichever occurs first. If it has been determined at 108 that the time interval has expired, the method 100, via the app 14, determines 116 whether the child had made a response to the parent prior to the expiration of the time interval, and if yes, the app 14 is discontinued or stops executing 118. However, if, and only if, it is determined at 108 and 116 that the response deadline has expired prior to a response being received from the child's device 18, the method 100, via the app 14 and the remote server 12, monitors 120 the child's device 18 and attempts to determine a geo location of the child's device 18 with a global positioning system (GPS) 16 that is in communication with the child's device 18 and the network 22. Once the child's device's geo location is determined at 120, the method includes the app 14 forwarding 122 the geo location of the child's device 18 from the remote server 12 to the parent's device 20. Upon determining at 116 that the time interval has expired without a response from the child's device 18, the release of the child's device's geo location is automatic and the child is unable to disable, defer, or interrupt the automatic release. In other words, if the child fails to respond within the allotted time interval, the child has no discretion over the release of their geo location. Accordingly, the automatic release of the child's device's geo location does not require any response, affirmative action, or explicit consent from the child. The parent and/or local authorities would have the option of disabling the app 14 at their discretion, such as if they are able to locate the child and determine that they are safe.

Optionally, after the initial time interval has expired and prior to the app 14 forwarding 122 the geo location of the child's device 18 to the parent's device 20, the method 100 may further include sending a warning alert to the child's device 18 to alert the child that the initial time interval has expired and that their geo location is to be imminently disclosed to the parent's device 20. Upon sending the warning alert to the child's device 18, in a similar manner to step 106 described above, the method 100, via app 14, initiates a final or last-chance countdown timer at the remote server 12 to monitor a final or last-chance time interval representing a last-chance deadline in which a response from the child's device 18 must be received by the parent's device 20. Similar to step 112 described above, if a response is received from the child's device 18 prior to the last-chance time interval expiring, the app 14 cancels the final countdown timer without releasing any geo location information of the child's device 18. Likewise, similar to steps 116 and 122 described above, if the last-chance time interval expires prior to a response being received from the child's device 18, the app 14 forwards the geo location of the child's device 18 from the remote server 12 to the parent's device 20.

The app 14 may require that the child makes a qualifying response by inputting a personal identification token which only the child should be able to provide. Examples of possible identification tokens include a personal identification number (pin), a biometric identifier, and an alphanumeric password. The requirement for a personal identification token may ensure that an unauthorized individual is unable to defer the disclosure of the child's device's geo location. For example, in the event that the child is abducted or held against their will, a would-be abductor or kidnapper would not know or be able to provide the identification token (unless the child provides the token to/for the abductor).

In an optional embodiment, the app 14 may enable a safe word, code, or phrase or another form of emergency alert signal to be input by the child such that when the safe word is provided as a response to the parent's device, the parent is alerted that the child is in some form of distress or danger without the abductor being made aware that the emergency signal was given. Inputting the safe word may automatically trigger the app 14 to determine 120 the child's device's 18 current or last known geo location and forward 122 it to the parent's device 20. The emergency alert signal and/or the child's device's geo location may be automatically directed to local authorities. As an example, in the event that an abductor has taken the child and attempted to force the child to respond to the parent's request for a response, the child may input the safe word while acting as though they sent the typical qualifying response. For example, the typical qualifying response may be a pin number, such as "1234", however the child would instead enter the safe word, code, or phrase such as "I'll be home for dinner". The app 14 recognizes the safe phrase and then (i) sends an alert to the parent's device 20 and/or the local authorities and/or (ii) determines the current or last known geo location of the child's device 18 and forwards the geo location to the parent's device 20 and/or the local authorities.

Additional features of the method 100, system 10, and app 14 may include providing local alerts or emergency signals by remotely activating components of the child's device 18. For example, if the countdown time interval expires without a response from the child's device 18, the app 14 may trigger the child's device 18 to emit an alert including one or more of sounding an alarm via a speaker of the child's device 18, repeatedly flashing a light of the child's device 18, and/or turning on a camera of the child's device 18, recording video via the camera, and forwarding the recorded video to the parent's device 20 and/or local authorities via the remote server 12.

Thus, the method and system enable a parent to locate their child in case of emergency or if the child is purposely non-responsive while providing a level of autonomy for the child as they may defer the release of their location by responding to the parent within a required time interval. The method utilizes an application and a remote server. The application only attempts to locate the child's device after the child has failed to respond within the required time interval. Otherwise, the child's geo location remains unknown to the application and inaccessible by the parent. In the event that the child does not respond in time, the application may also control some features of the child's phone, such as lights, speakers, cameras, and the like to attempt to alert nearby individuals that the child may be in danger or in need of assistance.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method of deferrable tracking of a subject individual's GPS enabled, network accessible mobile device, said method comprising:

executing a subject application on a requester's network accessible device;

a requester initiating, via the subject application, a request for a response from a subject individual's GPS enabled, network accessible mobile device that is in communication with the requester's device over a network;

initiating a deadline countdown timer at a remote server to monitor a time interval, the remote server in communication with each of the requester's device and the subject's device over the network, and the time interval representing a response deadline in which a response from the subject's device must be received by the requester's device;

monitoring the deadline countdown timer and the subject's device for the expiration of the time interval or a response from the subject's device prior to the response deadline;

wherein if a response is received from the subject's device prior to the response deadline, the subject application cancelling the deadline countdown timer without determining any geo location information of the subject's device; and wherein if, and only if, the response deadline expires prior to a response being received from the subject's device, the subject application, via the remote server monitoring the subject's device, determining a geo location of the subject's device with a global positioning system (GPS) that is in communication with the subject's device and the network; and forwarding the geo location of the subject's device from the remote server to the requester's device.

2. The method of claim 1, wherein after the deadline expires and prior to forwarding the geo location of the subject's device to the requester's device, said method further comprising:

sending a warning alert to the subject's device;

initiating a final countdown timer at the remote server to monitor a final time interval representing a last-chance deadline in which a response from the subject's device must be received by the requester's device; and wherein if a response is received from the subject's device prior to the last-chance deadline, the subject application cancelling the final countdown timer without releasing any geo location information of the subject's device; and wherein if the last-chance deadline expires prior to a response being received from the subject's device, the subject application forwarding the geo location of the subject's device from the remote server to the requester's device.

3. The method of claim 1, wherein a qualifying response from the subject's device to the requester's device requires an input from the subject individual of a personal identification token comprising at least one of a personal identification number, a biometric identifier, and an alphanumeric password.

4. The method of claim 1, wherein after the deadline expires without a response from the subject's device, said method further comprising remotely triggering the subject's device to emit an alert comprising at least one chosen from sounding an alarm via a speaker of the subject's device, repeatedly flashing a light of the subject's device, and turning on a camera of the subject's device and recording video via the camera and forwarding the recorded video to the requester's device and/or the remote server.

5. The method of claim 1, wherein the subject application is configured for receiving a safe word, code, or phrase as a response from the subject's device, determining that the subject is in distress, and performing one or more of the functions chosen from sending an alert to the requester and/or local authorities that the subject is in distress and determining the subject's geo location and forwarding it to the requester and/or local authorities.

6. A method for determining the location of child when the child fails to respond to a parent's communication request, said method comprising:

a parent sending a communication to a child and requesting a response from the child, the communication sent from a network accessible device of the parent to a global positioning system (GPS) enabled, network accessible mobile device of the child;

executing a subject application upon the parent sending the communication to the child;

the subject application initiating a countdown timer at a remote server to monitor a time interval in which the child may respond to the parent's request in order to defer the child's geo location being released to the parent's device;

the subject application determining whether the child has responded to the parent's request within the time interval;

wherein if the child responds to the parent's request within the time interval, the subject application cancelling the countdown timer; and wherein if the child has not responded to the parent's request and the time interval has expired, the subject application attempting to determine a geo location of the child's GPS enabled device, and if a geo location is determined, the subject application forwarding the child's device's geo location to the parent's device over the network.

7. The method of claim 6, wherein said attempting to determine a geo location of the child's device is performed via the remote server and any determined geo location is stored at the remote server until the subject application forwards the geo location to the parent's device.

8. The method of claim 7, wherein after the time interval has expired and prior to forwarding the geo location of the child's device to the parent's device, said method further comprising:

the subject application sending a warning alert to the child's device;

initiating a last-chance countdown timer at the remote server to monitor a last-chance time interval in which a response from the child's device must be received by the parent's device;

wherein if a response is received from the child's device prior to the last-chance time interval expiring, the subject application cancelling the last-chance countdown timer without releasing any geo location information of the child's device; and wherein if the last-chance time interval expires prior to a response being received from the child's device, the subject application forwarding the geo location of the child's device from the remote server to the parent's device.

9. The method of claim 6, wherein a qualifying response from the child's device to the parent's device requires an input from the child of a personal identification token comprising at least one of a personal identification number, a biometric identifier, and an alphanumeric password.

10. The method of claim 6, wherein after the time interval has expired without a response from the child's device, said method further comprising remotely triggering the child's device to emit an alert comprising at least one chosen from sounding an alarm via a speaker of the child's device, repeatedly flashing a light of the child's device, and turning on a camera of the child's device and recording video via the camera and forwarding the recorded video to the parent's device and/or the remote server.

11. The method of claim 6, wherein the subject application is configured for receiving a safe word, code, or phrase as a response from the child's device, determining that the child is in distress, and performing one or more of the functions chosen from sending an alert to the parent's device and/or local authorities that the subject is in distress and determining the child's geo location and forwarding it to the parent's device and/or local authorities.

* * * * *